(No Model.)
L. DAFT.
METHOD OF AND APPARATUS FOR STARTING ELECTRIC MOTORS.
No. 371,436. Patented Oct. 11, 1887.
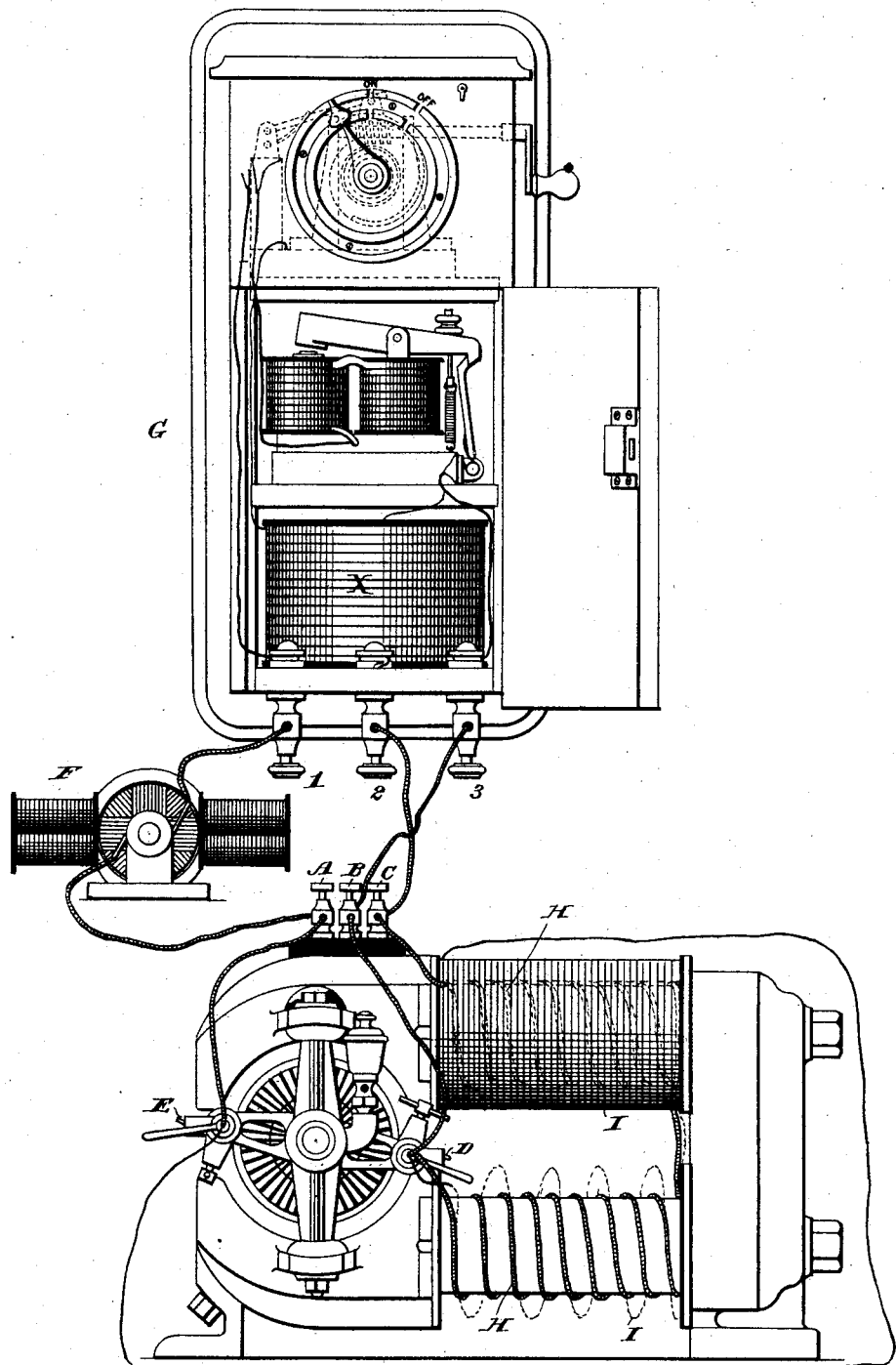

UNITED STATES PATENT OFFICE.

LEO DAFT, OF PLAINFIELD, NEW JERSEY.

METHOD OF AND APPARATUS FOR STARTING ELECTRIC MOTORS.

SPECIFICATION forming part of Letters Patent No. 371,436, dated October 11, 1887.

Application filed January 5, 1887. Serial No. 223,455. (No model.)

*To all whom it may concern:*

Be it known that I, LEO DAFT, a subject of the Queen of Great Britain, and a resident of Plainfield, Union county, New Jersey, have invented a new and useful Improvement in Electric Switches, of which the following is a specification.

The object of my invention is to utilize the electric limit-switch patented to me July 28, 1885, No. 322,916, for gradually starting an electric motor upon a developing circuit, so that the brushes of either motors or primary generator may not be injured. I use for this purpose as a motor a machine of the compound type, and I include the series coil of the field-magnet in the circuit of the resistance-coil of my limit-switch when starting, and after a suitable counter electro-motive force has been developed in the motor the series coil of the field-magnet, together with the resistance-coil of the limit switch, is cut out of the circuit, and the motor continues to operate as a pure shunt-wound machine.

In the annexed drawing my system is illustrated in its entirety.

G represents my limit-switch, which is so well described in my aforesaid Letters Patent that further description is unnecessary, except in so far as it is modified for the purpose of my invention.

In addition to the two binding-posts 1 and 3, which correspond to the binding-posts shown in my aforesaid patent, I use a binding-post, 2, in electrical connection with a resistance-coil, X, as indicated in the drawing. The motor is of the compound type, having a series or primary coil, H, and a shunt or secondary coil, I, upon the field-magnet.

F represents the generator, and connection is made from the same to the binding-post 1 of the limit-switch and to binding-post A upon the motor. There are two more binding-posts, B and C, upon the motor. The one B is connected to brush D, and the other, C, is connected with the series coil H. Besides this, post 3 is connected with post B and post 2 with post C. At brush D terminate one end of each of the primary and secondary coils, and the other end of the secondary coil is connected with brush E. The circuits through the apparatus can now be easily traced.

If the crank of the limit switch is turned so that the index will be at the point marked "Off," the contact-strips in the limit-switch will be on an insulating-section of the cam and the circuit will be broken, as is clearly described in my aforesaid Letters Patent; but if the crank be now turned to bring said contact springs upon metallic sections of the cam the circuit will be closed and the motor will operate as a compound machine, the circuits being as follows: from generator F to binding-post 1 of the limit-switch, through said switch and resistance-coil X to binding-posts 2 and C, through primary coil H of the field-magnet to brush D, through the armature, brush E, binding-post A, and back to the generator F. At the same time there will be a branch from brush D through the secondary coil I to brush E, as is well understood by those skilled in the art. If now the handle of the limit-switch is continued to be rotated until the index reaches the point marked "On," the motor will during this time continue to operate as a compound machine, and by the time the pointer reaches the mark "On" a considerable counter electro-motive force will have been developed. When the pointer reaches the mark "On," the contact-springs will bear upon the insulated metallic cross-strip at the highest point of the cam, clearly described in my aforesaid patent, and the circuit through the resistance-coil X will be broken and the series coil of the motor simultaneously cut out. The circuit will now be from the generator to binding-post 1, through the limit-switch to binding-post 3, and from there to binding-post B of the motor. From this point the circuit proceeds to brush D, through armature, brush E, binding-post A, and back to the generator, while a shunt from D to E, including the secondary coil of the motor, will charge the field-magnet. The motor will thus continue to operate as a pure shunt-machine, which is very desirable, because the variations in speed in such machines are exceedingly small under any variation of load up to its rated capacity, while on starting the compound machine is more effective.

The series coil of the motor may have the ordinary low resistance, in which case the resistance-coil X is essential; but if it is desired to dispense with a separate resistance-coil the primary field-coil should have considerable resistance.

Other modifications will suggest themselves to those skilled in the art, and I wish it to be understood that in the practice of my method I do not limit myself to the apparatus shown, but that I may employ any other means by which the same effect may be produced.

Having described my invention, what I claim, and desire to secure by Letters Patent, is—

1. The method of starting a compound electric motor, which consists in closing the circuit of the generator both by the series and shunt coils of the field of said motor and then cutting the series coil out of the circuit, substantially as described.

2. The method of starting an electric motor, which consists in developing a counter electromotive force in the motor as a compound machine and then converting the same into a pure shunt-wound machine, substantially as described.

3. A compound electric motor having three binding-posts, two of which are connected to the brushes and the third with one end of the series coil of the field-magnet, the other end of which is connected with one of the brushes, substantially as described.

4. The combination of a compound-wound electric motor having three terminals, as described, with a switch for closing the circuit through both field-coils and for cutting the series coil out of circuit in succession, substantially as described.

In testimony whereof I have signed my name to this specification in the presence of two subscribing witnesses.

LEO DAFT.

Witnesses:
 JOHN N. BRUNS,
 FRED. H. REED.